Jan. 8, 1952     C. W. ROSE     2,581,772
SAFETY BELT

Filed Oct. 4, 1946     2 SHEETS—SHEET 1

INVENTOR:
CLARENCE W. ROSE
BY WHITEHEAD & VOGL
PER *Earle Whitehead*
ATTORNEYS

Jan. 8, 1952 — C. W. ROSE — 2,581,772
SAFETY BELT
Filed Oct. 4, 1946 — 2 SHEETS—SHEET 2
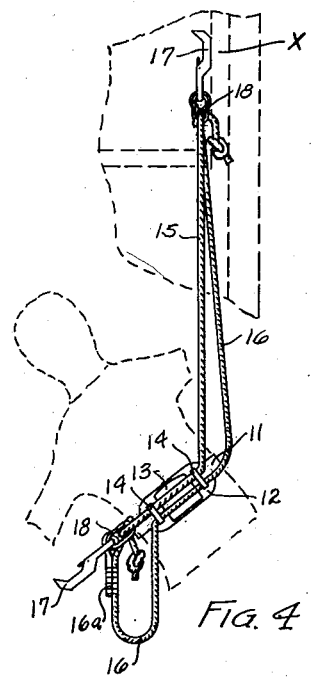
Fig. 4
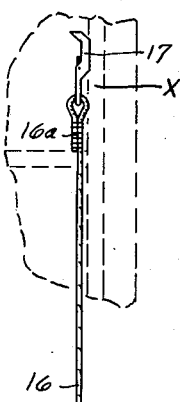
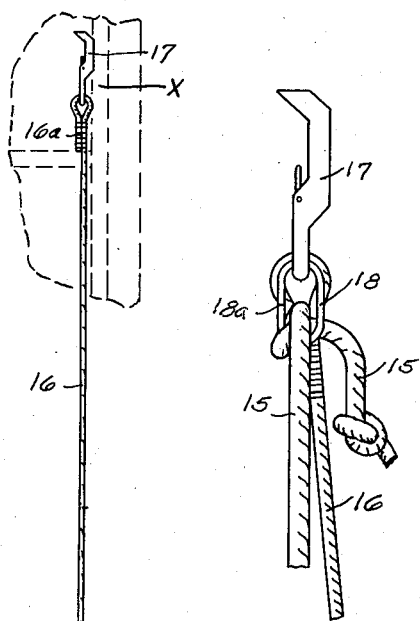
Fig. 7
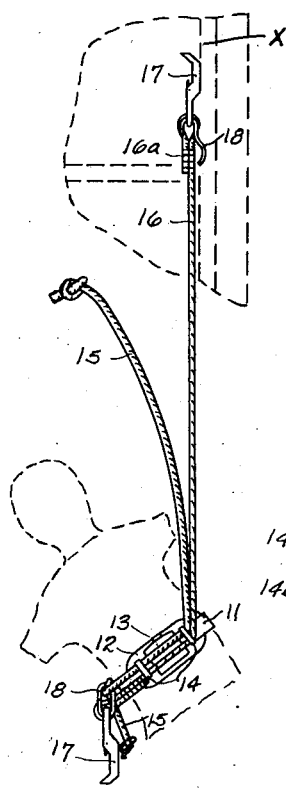
Fig. 5
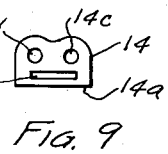
Fig. 9
Fig. 6
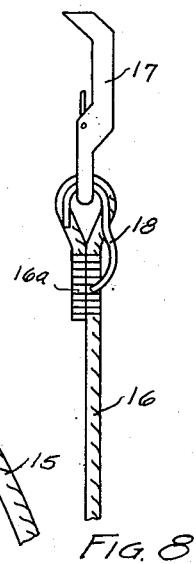
Fig. 8
INVENTOR:
CLARENCE W. ROSE
BY WHITEHEAD & VOGL
PER Earle Whitehead
ATTORNEYS

Patented Jan. 8, 1952

2,581,772

UNITED STATES PATENT OFFICE 2,581,772

SAFETY BELT

Clarence W. Rose, Denver, Colo., assignor to Rose Manufacturing Company, Denver, Colo., a partnership Application October 4, 1946, Serial No. 701,366

3 Claims. (Cl. 227—49)

This invention relates to safety devices of the class used to check the falling of workers or others wearing the device and particularly to safety belts having a double reach of rope, one being a service rope and the other being a safety or reserve rope, terminals, adapted for anchorage, being engaged to the ends of such ropes.

The most common use of such belts is by window washers, the terminals of whose belts are adapted to be anchored to bolts or other anchorages in the window casings or frames or in the adjacent masonry, one on either side of the wearer while he stands on the window ledge and washes the outer side of the window. The preferred embodiment of the present invention is in such a belt and the accompanying drawing illustrates such an embodiment and, accordingly, the present specification will be in terms of such embodiment, but it will be understood that there are other uses and embodiments of the invention which will readily occur to those skilled in the art and I am not to be limited to the embodiment or use in the terms of which this specification is written.

An object of the present invention is to so construct a safety belt that a stretchable rope may be used as the safety rope and full advantage be taken of the qualities of such rope while affording means for meeting the other requirements of such belt for the efficient use thereof.

A further object is to provide, in such a belt, the combination of a stretchable safety rope, a substantially non-stretchable service rope and means for automatically disengaging the service rope from a terminal upon the occurrence of predetermined conditions.

A further object is to provide a belt which, in case of the accidental fall of the wearer, will retard the fall and ease the wearer to a stop while providing for the free and unobstructed use of the belt under normal working conditions.

Still further objects of the invention are to provide, in such a belt, simple and easily operable means for adjusting the length of the service rope and for preventing the twisting of the service rope around the safety rope which tends to result from the tension on the service rope in use and to provide the safety features, above mentioned and hereinafter described, while reducing the number of parts in and the weight of belts of this class as heretofore constructed and assembled in efforts to accomplish similar results.

A still further object is to provide a suitable and novel means of protecting and preserving the safety rope.

With these and other objects in view, all of which will more fully hereinafter appear, the invention comprises certain novel constructions, arrangements and combinations of parts as will now be described and claimed and as illustrated, in preferred embodiment, in the accompanying drawing in which:

Fig. 4 is a view illustrating the belt, service rope, safety rope and associated parts in the positions assumed by said parts when a workman, wearing the belt, has fallen, with only one terminal anchored, and has nearly reached the end of the service rope.

Fig. 5 is a view like Fig. 4 but illustrating the position of the parts immediately after the service rope has been disconnected by the force of the fall of the workman and the safety rope is elongating, exerting a decelerating force.

Fig. 6 is a view like Fig. 5 but showing the position of the various parts when the decelerating force of the safety rope has brought the workman to a gradual stop.

Fig. 7 is a detail view of a terminal and fragments of the safety rope and of the service rope and the link normally connecting said service rope with the terminal, which also constitute adjustment means for the service rope.

Fig. 8 is a view similar to Fig. 7 but illustrating the link after its opening and the disconnection of the service rope from the terminal here illustrated as a release of the rope by the link.

Fig. 9 is a side elevation of one of the duplex rope eyes.

Figure 1:
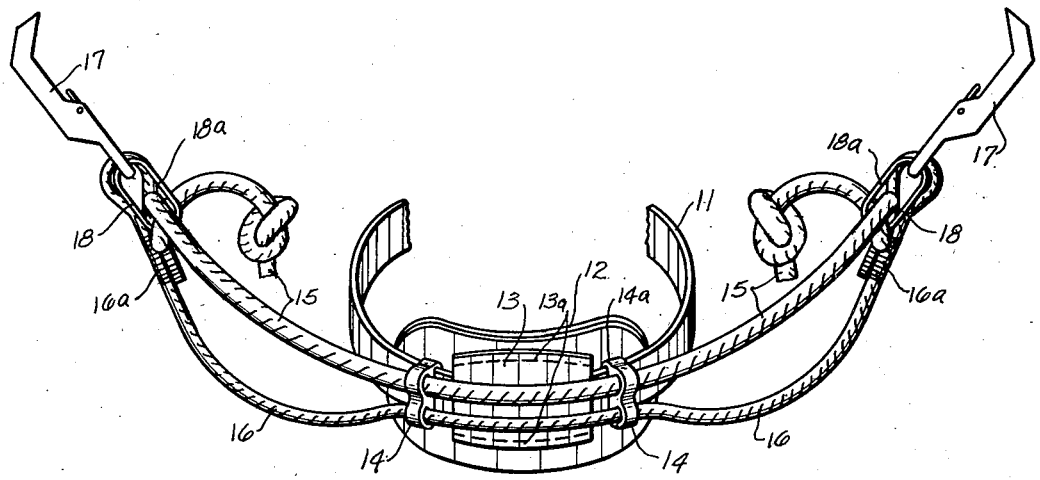
Fig. 1 is a perspective view of a safety belt for window cleaners, with its usual accompanying appliances but with the front including fastening means cut away, embodying the present invention.

In the present embodiment of this invention I provide a strap or belt 11 of canvas webbing or other suitable material, the ends of which, including the buckle or other fastening means, may be of any suitable construction and are no part of the present invention and are, therefore, not illustrated.

The member 11, which will be referred to as the "strap" in distinction from the whole assembly which is called a "safety belt," is provided with a suitable back pad 12. The pad 12 carries a protector 13, secured to the pad along its upper and lower edges by sewing or other suitable means indicated at 13a, whereby strap 11 may be passed between the pad and the protector, thus furnishing a secure engagement of the strap with the pad but permitting a sliding of one relative to the other.

Pad 12 carries ropes eyes 14 shown in detail at Fig. 9 and comprising a base 14a adapted for being secured to the pad, a slot 14b for strap 11 and eyes 14c and 14d for the service and safety ropes respectively. The base 14a may be secured to the pad by any suitable means, not shown. The slot 14b and eyes 14c and 14d permit the strap 11 and ropes 15 and 16 to respectively slide therethrough but hold said strap and ropes always in the same interrelative position at and between the two rope eyes, and serve to permanently connect the wearer of the strap with the safety rope even though the service rope becomes disconnected, and even though the rope eyes be separated from pad 12.

Service rope 15, of hemp or other suitable substantially non-stretchable material, lies slidably within the eyes 14c. The safety rope 16, of stretchable material and more particularly hereinafter described, lies slidably within the eyes 14d. Terminals 17, of any construction suitable for anchoring engagement with anchors provided on or near the window frames of buildings, are carried at the ends of the ropes as will now be described.

Each end of the service rope 15 is tied to a link 18 engaged to the terminal. The link is not solid but its ends 18a are brought together, as clearly shown at Fig. 1, making a closed link which links the service rope to the terminal but which will open and release the rope when subjected to a sufficient and predetermined pull. The link is of such material and size that it will withstand, without opening, the pulls or stresses that will be exerted upon it during and by the normal and intended activities of the wearer of the belt. The link is, however, so constructed that it will open and release the service rope when subjected to the pull of the body of the wearer falling, as illustrated at Fig. 8.

Safety rope 16 is secured to the terminals at both its ends by suitable means as by looping the end through the terminal and binding the end to the reach of the rope as illustrated at 16a.

The ends of the service rope may be tied to the link in any desired manner but to facilitate adjustments of the rope as to length it is desirable to use a slide hitch as illustrated most clearly at Fig. 7, whereby tension on the main reach of the rope will tighten the rope in the link but when the rope is free of such tension it can be readily loosened by hand and lengthened or shortened as desired. Such a tying of the rope to the link serves a further purpose, namely, to take care of the tendency of the rope to loop or twist and entangle the safety rope when the service rope has been subjected to strain in use. Any twisted rope, when subjected to a pull or strain, will slightly lengthen and untwist, resulting in a looping or kinking if the rope is permanently fastened at both ends. In such cases a swivel is commonly inserted in the rope to allow for such untwisting. The necessity for a swivel or other such means is obviated, in the present case, by the slip hitch connection of the rope to the link, it being a matter of only a moment to loosen the hitch, straighten the rope and again tighten the hitch. In fact such operation will generally be unnecessary because the straightening will automatically occur during the ordinary adjustments of length of the rope.

Figure 2:
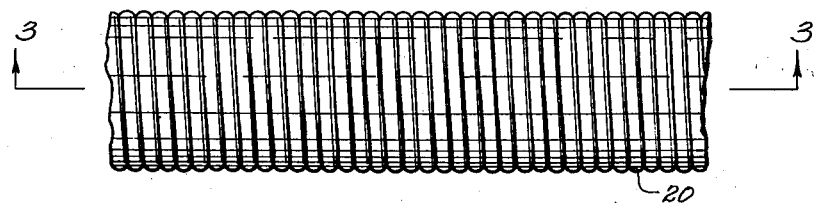
Fig. 2 is an elevation of a fragment of the safety rope of the type adapted for use in the present invention illustrating a covering adaptable for use on a rope performing its proper functions as a part of the present invention.
Figure 3:
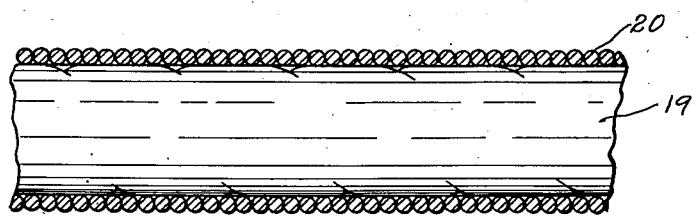
Fig. 3 is a section taken on line 3—3 of Fig. 2.

The safety rope must function as a shock absorber by virtue of either qualities inherent in the rope or equipment incorporated therein or associated therewith. The structure and function of the service rope and its associated parts will be the same in either case. There are, however, decided advantages in using a safety rope which has the shock absorbing qualities inherent within it and the use of such a rope is a part of the present invention, and it is illustrated at Figs. 2 and 3, where the rope having the shock absorbing qualities is indicated at 19 and a suitable covering for such rope is indicated at 20, the covering only being visible at Fig. 2.

The rope adaptable for use as such safety rope must be capable of being stretched but must have the quality of resisting the stretching force so that the stretching will be retarded from the beginning until the limit of stretching is reached. Preferably it will not have a quick reacting elasticity which would result in a quick or any substantial rebound of the stretching weight when the stretching limit is reached. Certain nylon rope now on the market has these qualities and such rope can be used as the safety rope in the preferred embodiment of this invention.

Any wear on such nylon or other similar rope would affect both its strength and its resistance to stretching and would therefore change its shock absorbing qualities. Accordingly, it is necessary to guard against the wearing of the safety rope from any cause, for example, by the rope eyes 14, protector 13, or anything else with which the rope may have contact. This protection may be accomplished by winding rope 19 with a small rope or twine 20 which will cover rope 19 completely and smoothly so long as the rope remains in normal, unstretched condition and will thus protect it from wear and other deteriorating influences. Moreover, when the winding 20 wears and becomes frayed its appearance gives warning, before any wear of the rope 19 takes place, that the danger point is approaching and that the rope should be replaced.

This wound covering will not hinder the stretching and shock absorbing functioning of the safety rope because as rope 19 is stretched its diameter decreases and the winding straightens out or is readily broken by the stretching. The breaking of the winding is not objectionable because a second use of a rope which has once saved a worker, is not contemplated. Other coverings may be used for rope 19.

The details of operation of the belt under all conditions is not attempted to be described, or illustrated. One typical and most frequently occurring and most dangerous case is sufficient for illustration. That is the case shown in the drawing in which a window washer falls when only one terminal is anchored to the window casing or adjacent wall indicated at X in Figs. 4, 5 and 6. In such a case the wearer of the belt drops to the position diagrammatically illustrated at Fig. 4 at which point the service rope has slid through the rope eyes and one of the rope eyes has contacted the assembly of parts at the unanchored terminal and the falling body is exerting its full falling impact upon that assembly and thus exerting its full downward pull on the service rope which is about to cause a separation of the link with resulting release of the end of the service rope which is linked to the anchored terminal.

After falling this distance the impact of the falling man against the lower end of the service rope will, when measured in weight, be much more than the weight of the man, and were the service rope and its link attachment to the anchored terminal strong enough to withstand such impact, it might result in either serious injury to the man from such a sudden stop or in pulling out or breaking the anchorage and letting the man drop to the ground.

In coordinating the strength of the link and the shock absorbing degree of the safety rope, actual conditions encountered in daily work must be considered. One of these conditions is the weakness of the anchorages in or adjacent to many of the window casings or other places where such belts are to be used. Many such anchorages are too weak to withstand a heavy pull. Some are so weak that no belt could be devised which would prevent such anchorage being pulled out by the falling of a worker for any substantial distance. Others are strongly enough installed to withstand almost any pull exerted by a falling worker, while a great many anchorages are strongly enough installed to withstand a pull considerably more than the weight of the man but not to withstand the pull of that weight plus the added pull resulting from his falling a substantial distance. For these reasons—in order as far as possible to prevent the pulling out or breaking of the anchorage as well as to avoid injury to the worker by too sudden a stop, the safety rope should be so adjusted or constructed that it will keep the pull on that rope (during the deceleration period) as low as possible and still decelerate the fall of the belt wearer to a stop at a substantial distance before the end of the safety rope is reached or, in case of the stretchable rope, before the limit of stretch is reached.

For example, the stretchable rope above referred to, will stretch 400 per cent, i. e. to a total of five times its unstretched length. Such a rope having a normal length of eight feet will stretch to a total of forty feet. In order to leave a sufficient safety factor such rope should be designed to so decelerate the fall of a man, wearing such a belt, that he will be brought to a stop when the rope is about twenty-four feet and not to exceed about thirty-two feet in length.

Now assume that such a deceleration will result in a three hundred pound pull on the anchorage, the strength of the link should be such that it will open with a somewhat less pull than the pull expected to be exerted on the safety rope after the service rope has been released by separation of the link. Where such expected pull on the safety rope is three hundred pounds, the link could be made so as to open responsive to, say, a two hundred fifty pound pull, in which case the fall of the man would be partially checked before the link opened and before the pull is passed from the service rope to the safety rope. Using the above illustrative figures as a further example, a link which will remain closed up to a two hundred fifty pound pull will be of ample strength to take care of all conceivable pulls which could be exerted by the normal activities of the user of the belt because, during such normal activities, both terminals are anchored and both links are operative and the pull is equalized between them so that the two links, each capable of holding a two hundred fifty pound pull without opening, would withstand a five hundred pound pull on the service rope without either link opening. The foregoing figures are not intended as definition or limitation but are assumed simply for the purpose of illustrating the problem to be met in coordinating the degree and quality of stretchableness of the safety rope and the pull-withstanding strength of the link.

Returning to the drawing and the operation therein illustrated, Fig. 5 diagrammatically illustrates the situation and position of the various elements in case of a fall and immediately after the link has been opened by the pull on the service rope and has released the service rope, thereby immediately transferring the pull exerted by the falling body from the service rope to the safety rope which now begins to stretch under the pull of the falling body, but which also begins to exert a retarding influence on such body. Suppose the man weighs one hundred fifty pounds and the rope is adapted to stretch in response to any pull over three hundred pounds. The impact of the body which, in effect, drops from the service rope onto the safety rope, will, because of its momentum, exceed three hundred pounds in pull on the safety rope, and that rope will stretch and continue to do so as long as the pull exerted by the falling body is over three hundred pounds but the resistance of the rope will decelerate the speed of the falling body until it has reduced the pull to three hundred pounds and there stopped the fall because the rope will not further stretch after the pull has been reduced to that amount. The position of the various parts when the body has come to a stop is illustrated at Fig. 6.

The stretching of the safety rope in the manner hereinbefore described is actually a drawing action, physically similar to the common drawing of a wire wherein there is a stretching accompanied by permanent elongation. The word "drawing" more exactly describes the action than the word "stretching" heretofore used. The energy required to cause such drawing in the safety rope results in the gradual deceleration of a falling man, and the essential physical characteristic of the safety rope is that it be of drawable material initially in an undrawn state, such as undrawn nylon, and that as a result of the drawing the rope is permanently elongated to a length substantially greater than the undrawn length and of a substantially less diameter than the undrawn rope but without any loss of strength of the rope.

While I have illustrated and described many details of construction there are many alternative and equivalent structures which will occur to those skilled in the art and which are within the scope and spirit of my invention and of the appended claims, and I am not to be restricted in my protection to the details here illustrated or described.

I claim:

1. A safety device including a belt, means carried by the belt having eyes for slidably securing ropes to the belt, a substantially non-stretchable service rope secured by some of said eyes, a safety rope of drawable material in an undrawn state, secured by other of said eyes, said undrawn drawable material being of a character which can be permanently elongated to a length substantially greater than its undrawn length, anchorage terminals at the ends of said ropes, and a link engaging an end of the service rope to a terminal, said link being adapted to sever and release the rope responsive to a predetermined pull as caused by the fall of the wearer of the belt, said safety rope being directly secured to said terminal.

2. In a device as defined in claim 1, the link for attaching the service rope to the terminals having a weakened portion.

3. A safety device including a belt, means carried by the belt having eyes for slidably securing ropes to the belt, a substantially non-stretchable service rope secured by some of said eyes, a safety rope of undrawn nylon secured by other of said eyes, anchorage terminals at the ends of said ropes, a link connecting an anchorage terminal to an end of the service rope, said link being adapted to sever and release the service rope responsive to a predetermined pull as caused by the weight of a wearer of the belt in a fall, said safety rope being directly secured to the terminals.

CLARENCE W. ROSE.

REFERENCES CITED

The following references are of record in the file of this patent:

UNITED STATES PATENTS

| Number | Name | Date |
|---|---|---|
| 341,219 | Cadbury et al. | May 4, 1886 |
| 2,130,948 | Carothers | Sept. 20, 1938 |
| 2,175,571 | Rose et al. | Oct. 10, 1939 |
| 2,302,642 | Deike, Jr. | Nov. 17, 1942 |
| 2,313,058 | Francis, Jr. | Mar. 9, 1943 |
| 2,317,346 | Reith | Apr. 27, 1943 |
| 2,343,892 | Dodge et al. | Mar. 14, 1944 |
| 2,433,722 | Weiss | Dec. 30, 1947 |
| 2,459,545 | Schultz | Jan. 18, 1949 |